US008082543B2

(12) United States Patent
Ford

(10) Patent No.: US 8,082,543 B2
(45) Date of Patent: Dec. 20, 2011

(54) METHODS AND SYSTEMS FOR ARBITRATING ERROR HANDLING AND FIRMWARE UPDATES

(75) Inventor: Thomas Ford, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1307 days.

(21) Appl. No.: 11/465,161

(22) Filed: Aug. 17, 2006

(65) Prior Publication Data
US 2008/0046877 A1    Feb. 21, 2008

(51) Int. Cl.
G06F 9/44        (2006.01)
G06F 11/00      (2006.01)

(52) U.S. Cl. .................... 717/168; 714/48; 714/100

(58) Field of Classification Search .............. None
See application file for complete search history.

(56) References Cited

U.S. PATENT DOCUMENTS

| | | | |
|---|---|---|---|
| 6,532,529 B1 | 3/2003 | Hongo | |
| 6,963,970 B2 | 11/2005 | Culter et al. | |
| 7,039,836 B2 | 5/2006 | Powers et al. | |
| 7,171,658 B2 * | 1/2007 | Ha | 717/168 |
| 7,320,126 B2 * | 1/2008 | Chang et al. | 717/168 |
| 7,797,693 B1 * | 9/2010 | Gustafson et al. | 717/168 |
| 7,809,993 B2 * | 10/2010 | Bolan et al. | 714/48 |
| 2003/0074601 A1 * | 4/2003 | Schultz et al. | 714/15 |
| 2005/0144609 A1 * | 6/2005 | Rothman et al. | 717/168 |
| 2005/0223291 A1 * | 10/2005 | Zimmer et al. | 714/34 |
| 2006/0010450 A1 | 1/2006 | Culter | |
| 2006/0075309 A1 * | 4/2006 | Mayo et al. | 714/40 |
| 2006/0107107 A1 * | 5/2006 | Michaelis et al. | 714/11 |
| 2007/0220372 A1 * | 9/2007 | Chen | 714/52 |
| 2008/0052699 A1 * | 2/2008 | Baker et al. | 717/168 |
| 2008/0141076 A1 * | 6/2008 | Hu et al. | 714/45 |

FOREIGN PATENT DOCUMENTS

| | | |
|---|---|---|
| JP | 2001-075941 | 3/2001 |
| JP | 2002-312302 | 10/2002 |
| JP | 2002-344837 | 11/2002 |

OTHER PUBLICATIONS

Intel Corporation, "Intel Itanium Processor Family Error Handling Guide," Apr. 2004.
Japan Office Action, translated, dated Feb. 25, 2011, 4 pages.
Japan Office Action, translated, dated Nov. 9, 2010, 4 pages.

* cited by examiner

Primary Examiner — Thuy Dao

(57) ABSTRACT

A computer system is provided that comprises a processor and firmware in communication with the processor, the firmware having updatable components and an arbitrator. The arbitrator manages conflicts between error handling and firmware updates performed within the firmware.

19 Claims, 4 Drawing Sheets

METHODS AND SYSTEMS FOR ARBITRATING ERROR HANDLING AND FIRMWARE UPDATES

BACKGROUND

The firmware of a computer platform has traditionally been seen as a single entity that is packaged as a single image. More recently, some computer platforms have established separate firmware components. For example, the Itanium Processor Family (IPF) standard establishes a Processor Abstraction Layer (PAL), a System Abstraction Layer (SAL), and an Extensible Firmware Interface (EFI) as separate firmware components.

At least some firmware architectures (e.g., "Banyan") are able to divide a firmware component such as SAL into several distinct sub-components. At least some of these distinct sub-components can be updated during runtime of the associated computer platform. Also, new distinct sub-components can be added

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention enable distinct firmware components of a computer platform to be updated, replaced or added. Embodiments of the invention also enable firmware components to process errors in the computer platform and possibly correct the errors. In at least some embodiments, requests to update, replace or add a firmware component and requests to handle an error are arbitrated by the firmware. For example, if a firmware update is in progress when a conflicting handle error request is received, the firmware can delay handling the error until after the firmware update is complete. Alternatively, if the firmware is handling an error when a conflicting firmware update request is received, the firmware can delay updating (or adding) the firmware until the error handling is complete. Other arbitration techniques are also possible.

Figure 1:
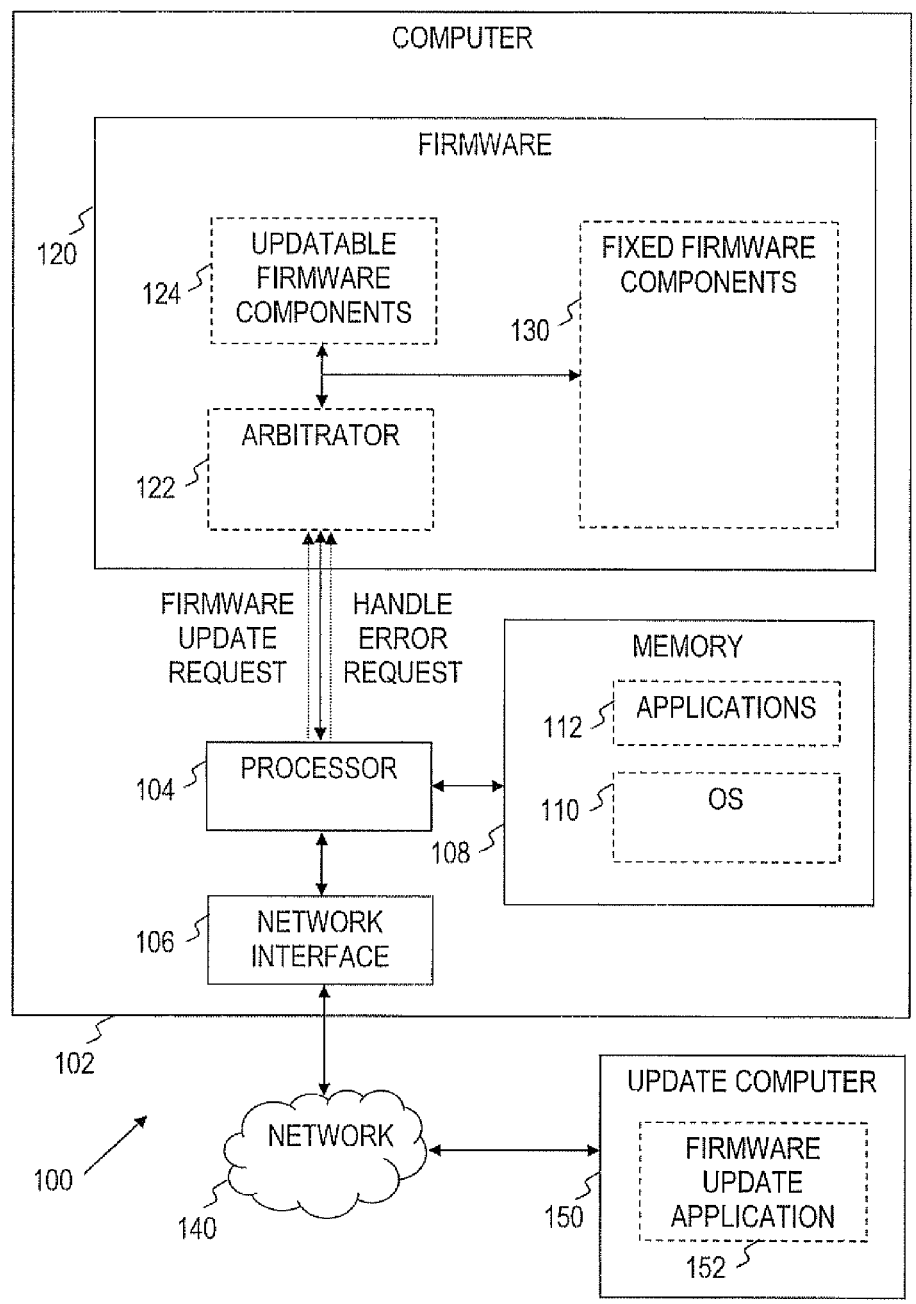
FIG. 1 shows a system in accordance with embodiments of the invention.

FIG. 1 shows a system 100 in accordance with embodiments of the invention. As shown in FIG. 1, the system 100 comprises a computer 102 coupled to an update computer 150 via a network 140. As shown, the computer 102 comprises a processor 104 coupled to a network interface 106. The network interface 106 enables the computer 102 to send data to and receive data from devices on the network 140. For example, the computer 102 may receive a firmware update image from the update computer 150 to update, replace or add one or more updatable firmware components 124 as will later be described. The processor 104 also couples to a memory 108 that stores an operating system (OS) 110 and other applications 112 for execution by the processor 104

As shown in FIG. 1, the processor 104 is in communication with firmware 120 including updatable firmware components 124, fixed firmware components 130 and an arbitrator 122. As used herein, "updatable firmware components" are firmware components that can be updated during runtime of the computer 102 and "fixed firmware components" are firmware components that cannot be updated during runtime of the computer 102. In some embodiments, at least one of the fixed firmware components 130 is used when updating or adding to the updatable firmware components 124. Also, the arbitrator 122 may be one of the fixed components 130 in some embodiments.

If a user or administrator of the computer 102 desires to update, replace or add to the updatable firmware components 124, a firmware update request is asserted to the firmware 120. As shown in FIG. 1, the firmware update request could be asserted by the processor 104. For example, the firmware update request could be asserted in response to instructions provided by a firmware update application executed locally or remotely, instructions provided by a local storage device (e.g., a CD-ROM, floppy disk, flash memory device or smart card) and associated input device (not shown), and/or instructions provided by the OS 110 or another application 112 being executed by the processor 104. Although FIG. 1 shows the firmware update request is asserted by the processor 104, the firmware update request could alternatively be asserted by platform entities other than the processor 104 (e.g., the OS 110).

To update, replace or add to the updatable firmware components 124, a firmware update image is transmitted to the firmware 120 either with the firmware update request or after the firmware update request has been accepted. In at least some embodiments, a secure (encryption key protected) session can be established prior to transmitting the firmware update image to the firmware 120. The firmware update image can be provided by the firmware update application 152 being executed remotely by the update computer 150 or locally by the computer 102. Alternatively, the firmware update image could be provided by a local storage device (e.g., a CD-ROM, floppy disk, flash memory device or smart card), by the OS 110 or by another application 112 being executed by the processor 104. In summary, the firmware update request and corresponding firmware update image can originate locally or remotely to the computer 102. In either case, a secure session can be established between the entity that provides the firmware update image and the firmware 120.

During runtime of the computer 102, errors may occur. For example, errors may involve hardware internal to or external to the processor 104. Additionally or alternatively, errors may involve software being executed (e.g., errors generated by the OS 110 or one of the applications 112). The errors may involve one or more bits of data. Regardless of the source, certain errors are detectable by the processor 104, the firmware 120, the OS 110 or other platform entities. While these detectable errors are not necessarily related to the firmware 120, platform entities such as the processor 104 or the OS 110 may request that the firmware 120 handle an error. For example, in FIG. 1, the processor 104 is shown asserting a handle error request to the firmware 120. In some cases, the firmware 120 is able to process the handle error request and correct the error. If the firmware 120 processes the handle error request but cannot correct the error, the firmware 120 may request that the processor 104, the OS 110 or another platform entity handle the error. If the error cannot be corrected, the computer 102 may be forced to shut down or restart.

Since the firmware 120 may receive both firmware update requests and handle error requests during runtime of the computer 102, the arbitrator 122 is implemented to arbitrate between the different requests. In at least some embodiments, at least one of the fixed firmware components 130 is needed to process both firmware update requests and handle error requests. Thus, in some cases, a fixed firmware component 130 involved with processing a handle error request cannot be involved with processing a firmware update request without interrupting the error handling process. Alternatively, in some cases, a fixed firmware component 130 involved with processing a firmware update request cannot be involved with processing a handle error request without interrupting the firmware update process. Thus, the arbitrator 122 determines how the firmware 120 manages conflicts between firmware update requests and handle error requests.

In at least some embodiments, the arbitrator 122 manages conflicts between firmware update requests and handle error requests by completing a request already in progress and delaying a conflicting request. For example, if a firmware update is in progress when a conflicting handle error request is received, the arbitrator 122 causes the firmware 120 to delay handling the error until after the firmware update is complete. Alternatively, if the firmware 120 is handling an error when a conflicting firmware update request is received, the arbitrator 122 causes the firmware 120 to delay updating (or adding) the firmware until after the error handling is complete.

In alternative embodiments, the arbitrator 122 manages conflicts between firmware update requests and handle error requests by selectively giving priority to firmware update requests. For example, if a firmware update is in progress when a conflicting handle error request is received, the arbitrator 122 causes the firmware 120 to delay handling the error until after the firmware update is complete. Alternatively, if the firmware 120 is handling an error when a conflicting firmware update request is received, the arbitrator 122 causes the firmware 120 to stop or to delay handling the error and to process the firmware update request instead. Once the firmware update is complete, the error handling process can continue or can be restarted. In at least some embodiments, if a handle error request is interrupted and cannot be delayed, the arbitrator 122 notifies a platform entity such as the processor 104 or the OS 110 that the handle error request could not be completed or that the error could not be corrected. For example, the arbitrator 122 could provide notification to the platform entity that asserted the handle error request or to a platform entity that handles errors when the firmware 120 is unable to handle or correct the error.

In alternative embodiments, the arbitrator 122 manages conflicts between firmware update requests and handle error requests by selectively giving priority to handle error requests. For example, if the firmware 120 is handling an error when a conflicting firmware update request is received, the arbitrator 122 causes the firmware 120 to delay updating (or adding) the firmware until after the error handling is complete. Alternatively, if a firmware update is in progress when a conflicting handle error request is received, the arbitrator 122 causes the firmware 120 to stop or to delay updating the firmware and to process the handle error request instead. Once the error handling is complete, the firmware update process can continue or can be restarted. In at least some embodiments, if a firmware update request is interrupted and cannot be delayed, the arbitrator 122 notifies the local entity or remote entity which requested the firmware update that the firmware update could not be completed.

In some embodiments, the arbitrator 122 manages conflicts between firmware update requests and handle error requests based on timing considerations. For example, if a firmware update has been in progress for less than a threshold amount of time when a conflicting handle error request is received, the arbitrator 122 may process the error and delay the firmware update. Alternatively, if error handling has been in progress for less than a threshold amount of time when a conflicting firmware update request is received, the arbitrator 122 may update the firmware and delay the error processing.

Also, if a firmware update has been in progress for more than a threshold amount of time when (or after) a conflicting handle error request is received, the arbitrator 122 may interrupt or delay processing the error even if handle error requests normally have higher priority than firmware updates. Alternatively, if a firmware update has been in progress for more than a threshold amount of time when (or after) a conflicting handle error request is received, the arbitrator 122 may interrupt or delay the firmware update to process the error even if firmware updates normally have higher priority than processing errors. The use of timing considerations by the arbitrator 122 could involve, for example, counters and operations that check and update the status of firmware update requests, firmware update operations, handle error requests and error handling operations.

In some embodiments, the arbitrator 122 manages conflicts between firmware update requests and handle error requests based on the identity of particular requests (i.e., different types of firmware update requests and handle error requests can be identified and handled accordingly). For example, a particular type of firmware update request may have priority over a particular type of handle error request or vice versa. In such embodiments, the arbitrator 122 retrieves identifying information provided with each request and uses the identifying information to prioritize conflicting requests. In some embodiments, the arbitrator 122 combines timing considerations, priorities, and other policies to handle conflicts between firmware update requests and handle error requests.

In some embodiments, at least one fixed component 130 is responsible for a basic level of error handling while at least one updatable component 124 is responsible for an extended level of error handling. In some cases, if a firmware update is in progress, a fixed component 130 that provides basic error handling is available even though an updatable component 124 that provides extended error handling is not available. Thus, the arbitrator 122 may determine whether to delay error processing or to perform basic error handling while the firmware update is in progress. In some embodiments, the arbitrator 122 takes in account that delaying some handle error requests potentially results in degraded error handling ability by the firmware 120.

Figure 2:
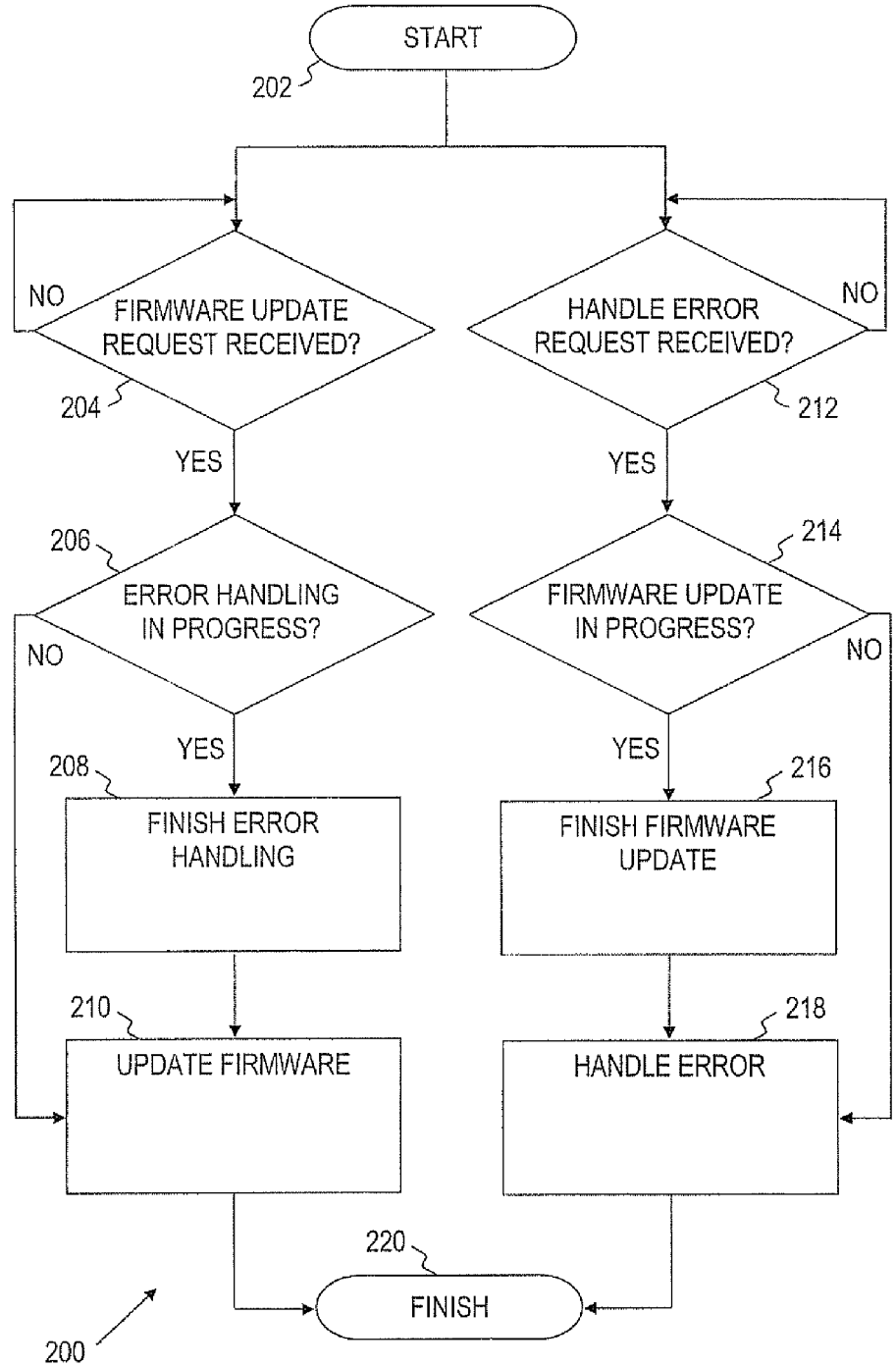
FIG. 2 shows a method in accordance with embodiments of the invention.

FIG. 2 shows a method 200 in accordance with embodiments of the invention. As shown in FIG. 2, the method 200 begins at the start block 202. If a firmware update request has not been received (determination block 204), the method 200 returns to the determination block 204. If a firmware update request has been received (determination block 204), the method 200 determines if error handling is in progress (determination block 206). If error handling is in progress (determination block 206), the method completes the error handling (block 208). If the error handling is not in progress (determination block 206) or the error handling is complete (block 208), the firmware is updated (block 210).

The method 200 further comprises determining if a handle error request has been received (block 212). If a handle error request has not been received (determination block 212), the method 200 returns to the determination block 212. If a handle error request has been received (determination block 212), the method 200 determines if a firmware update is in progress (determination block 214). If a firmware update is in progress (determination block 214), the method completes the firmware update (block 216). If the firmware update is not in progress (determination block 214) or the firmware update is complete (block 216), the error is handled (block 218). After the blocks 210 and 218, the method 200 ends at the finish block 220.

Figure 3:
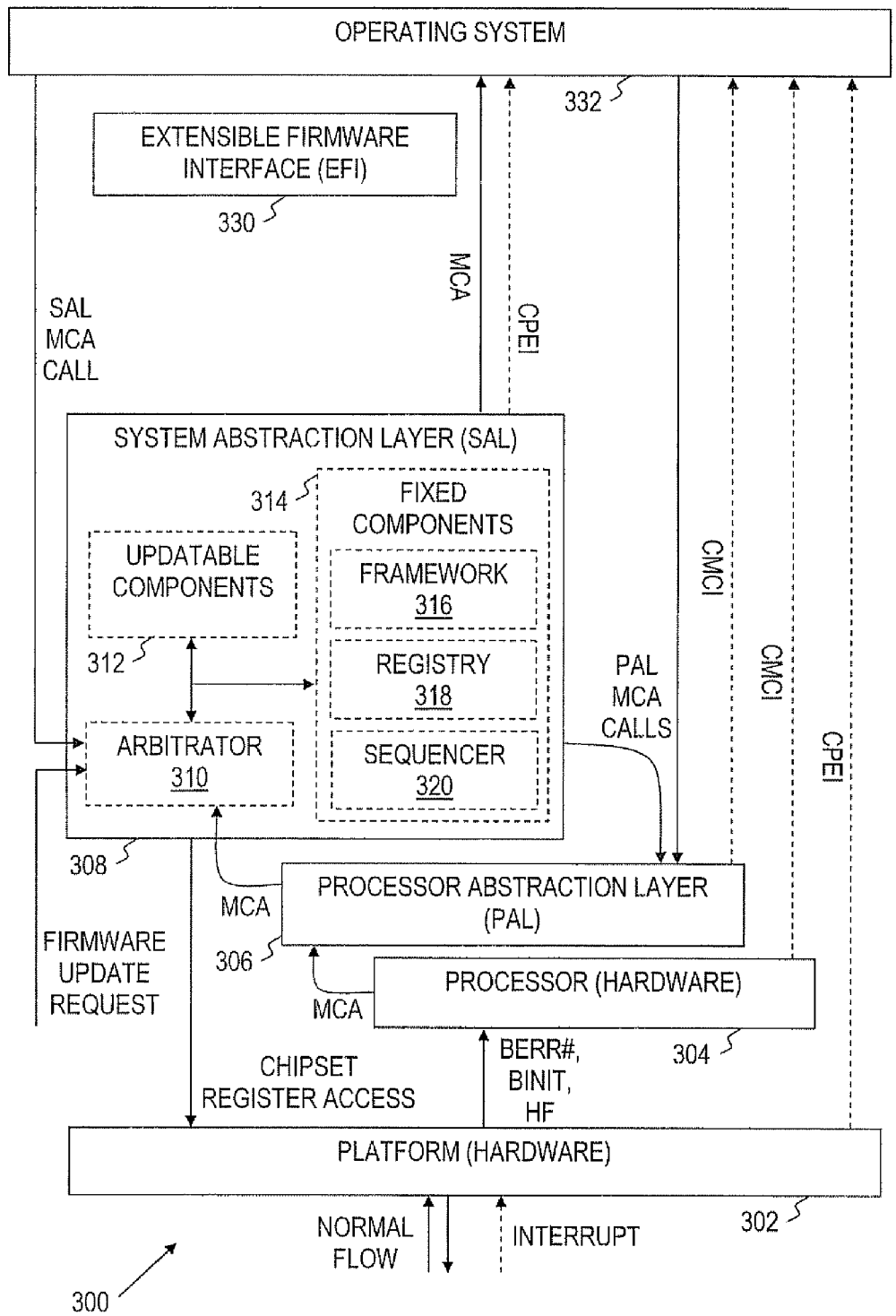
FIG. 3 shows another system in accordance with embodiments of the invention.

FIG. 3 shows another system 300 in accordance with embodiments of the invention. As shown in FIG. 3, the system 300 comprises a platform (hardware entities) 302 coupled to a processor 304. The processor 304 is also in communication with a processor abstraction layer (PAL) 306 and an operating system (OS) 332. As shown, the system 300 also comprises a system abstraction layer (SAL) 308 in communication with the platform 302, the PAL 306 and the OS 332. For example, the SAL 308 may access chipset registers of the platform 302 in completing certain tasks. The PAL 306 and the SAL 308 are firmware components that are able to handle certain errors detected by the system 300 as will later be described. The system 300 also comprises an Extensible Firmware Interface (EFI) 330 that is not necessarily involved with handling errors detected by the system 300.

As shown in FIG. 3, the SAL 308 comprises updatable components 312 and fixed components 314. The updatable components 312 can be updated during runtime of the computer system 300 while the fixed components 314 cannot be updated during runtime of the system 300. In at least some embodiments, the updatable components 312 are part of a firmware architecture referred to as the "Banyan" architecture.

As shown, the fixed components 314 comprise a framework 316, a registry 318 and a sequencer 320. In at least some embodiments, the framework 316 and the registry 318 enable communication between firmware components which may be added, replaced or updated at runtime. Specifically, the registry 318 maintains a list of the currently installed firmware components and the framework 316 coordinates communication between components listed in the registry 318. The sequencer 320 is the controlling entity for booting the system 300 and for processing handle error requests. In some embodiments, the arbitrator 310 is one of the fixed components 314.

When updating, replacing or adding to the updatable components at least one of the fixed components 314 may be involved. For example, the communication mechanism provided by the framework 316 and the list provided by the registry 318 may enable communication between updatable components 312 while a firmware update is in progress. The fixed components 314 may also comprise other SAL components and EFI components that enable hardware initialization, management, and error handling functionality.

If a user or administrator of the system 300 desires to update, replace or add to the updatable components 312, a firmware update request is asserted to the SAL 308. In FIG. 3, the firmware update request could be asserted, for example, by the platform 302, the processor 304 or the OS 332. In at least some embodiments, the firmware update request is asserted by the platform 302, the processor 304 or the OS 332 in response to instructions provided by a firmware update application executed locally or remotely, instructions provided by a local storage device (e.g., a CD-ROM, floppy disk, flash memory device or smart card) and associated input device (not shown), or instructions provided by another application being executed by the processor 304.

To update, replace or add to the updatable components 312, a firmware update image is transmitted to the SAL 308 either with the firmware update request or after the firmware update request has been accepted. In at least some embodiments, a secure (encryption key protected) session can be established prior to transmitting the firmware update image to the SAL 308. The firmware update image can be provided by a firmware update application executed locally or remotely, by a local storage device (e.g., a CD-ROM, floppy disk, flash memory device or smart card), by the OS 332 or by another application being executed by the processor 304. In other words, the firmware update request and corresponding firmware update image can originate locally or remotely to the system 300. In either case, a secure session can be established between the entity that provides the firmware update image and the SAL 308

During runtime of the system 300, errors may occur. For example, errors may involve hardware internal to or external to the processor 304. Additionally or alternatively, errors may involve software such as the OS 332 or another application. The errors may involve one or more bits of data. Regardless of the source, certain errors are detectable by the platform 302, the processor 304, the PAL 306, the SAL 308 or the OS 332. While these detectable errors are not necessarily related to the SAL 308, other system entities (e.g., the platform 302, the processor 304, the PAL 306 or the OS 332) may request that the SAL 308 handle an error.

As an example, FIG. 3 shows that the platform 302 sends and receives a normal flow of data. On occasion, an interrupt representing an error is received by the platform 302. If the platform 302 is able to correct the error, the platform 302 asserts a Corrected Platform Error Interrupt (CPEI) signal to the OS 332 to indicate the error was corrected and the system 300 continues normal operation. If the platform 302 is unable to correct the error, the platform 302 asserts an error signal such as a Bus Error signal ("BERR#"), a Bus Initialization signal ("BINIT") or a Hard Failure signal ("HF") to the processor 304 and the processor 304 handles the error. If the processor 304 is able to correct the error, the processor 304 asserts a Corrected Machine Check Interrupt (CMCI) signal to the OS 332 to indicate the error was corrected and the system 300 continues normal operation. If the processor 304 is unable to correct the error, the processor 304 asserts a Machine Check Abort (MCA) signal to the PAL 306 and the PAL 306 handles the error. If the PAL 306 is able to correct the error, the PAL 306 asserts a CMCI signal to the OS 332 to indicate the error was corrected and the system 300 continues normal operation. If the PAL 306 is unable to correct the error, the PAL 306 assets an MCA signal to the SAL 308 and the SAL 308 handles the error. If the SAL 308 is able to correct the error, the SAL 308 asserts a CPEI signal to the OS 332 to indicate the error was corrected and the system 300 continues normal operation. If the SAL 308 is unable to correct the error, the SAL 308 asserts an MCA signal to the OS 332 and the OS 332 handles the error. If the OS 332 is able to correct the error, the system 300 continues normal operation. If the OS 332 is unable to correct the error, the system 300 responds by shutting down, restarting or some other action in response to the uncorrected error.

In the above example, the error was detected by the platform 302 and was selectively handled by the processor 304, then the PAL 306, then the SAL 308, then the OS 332. Alternatively, an error could be detected first by the OS 332 which may request that the SAL 308 or the PAL 306 handle the error by respectively asserting an MCA signal to the SAL 308 or to the PAL 306. Alternatively, an error could be detected first by the PAL 306 or the SAL 308 and processed in like manner. In summary, the components of the system 300 interact together to detect errors and, if possible, correct errors in the system 300. If an error cannot be corrected, the system 300 responds by shutting down, restarting or some other action in response to the uncorrected error.

Since the SAL 308 may receive both firmware update requests and handle error requests (MCAs) during runtime of the system 300, the arbitrator 310 is implemented to arbitrate between the different requests. In at least some embodiments, at least one of the fixed firmware components 314 is needed to process both firmware update requests and MCAs. Thus, in some cases, a fixed firmware component 314 involved with processing an MCA cannot be involved with processing a firmware update request without interrupting the SAL's MCA handling process. Alternatively, in some cases, a fixed firmware component 314 involved with processing a firmware update request cannot be involved with processing an MCA without interrupting the SAL's firmware update process. Thus, the arbitrator 310 determines how the SAL 308 manages conflicts between firmware update requests and MCA processing.

In at least some embodiments, the arbitrator 310 manages conflicts between firmware update requests and MCA processing by completing a request already in progress and delaying a conflicting request. For example, if a firmware update is in progress when an MCA is received, the arbitrator 310 causes the SAL 308 to delay processing the MCA until after the firmware update is complete. Alternatively, if the SAL 308 is processing an MCA when a firmware update request is received, the arbitrator 310 causes the SAL 308 to delay updating (or adding) the firmware until after the MCA processing is complete.

In alternative embodiments, the arbitrator 310 manages conflicts between firmware update requests and MCA processing by selectively giving priority to firmware update requests. For example, if a firmware update is in progress when an MCA is received, the arbitrator 310 causes the SAL 308 to delay processing the MCA until after the firmware update is complete. Alternatively, if the SAL 308 is handling an MCA when a firmware update request is received, the arbitrator 310 causes the SAL 308 to stop or to delay processing the MCA and to process the firmware update request instead. Once the firmware update is complete, the MCA processing continues or restarts. In at least some embodiments, if MCA processing is interrupted and cannot be delayed, the arbitrator 310 notifies a platform entity such as the PAL 306 or the OS 332 that the MCA could not be processed or that the error could not be corrected. For example, the arbitrator 310 could provide the notification to the platform entity that asserted the MCA or to the platform entity that handles an error when the SAL 308 is unable to correct the error. In some cases, the notification could simply be another MCA signal.

In alternative embodiments, the arbitrator 310 manages conflicts between firmware update requests and MCA processing by selectively giving priority to MCA processing. For example, if the SAL 308 is processing an MCA when a firmware update request is received, the arbitrator 310 causes the SAL 308 to delay updating (or adding) the firmware until after MCA processing is complete. Alternatively, if a firmware update is in progress when an MCA is received, the arbitrator 310 causes the SAL 308 to stop or to delay updating the firmware and to process the MCA instead. Once MCA processing is complete, the firmware update process continues or restarts. In at least some embodiments, if a firmware update request is interrupted and cannot be delayed, the arbitrator 310 notifies the local entity or remote entity which requested the firmware update that the firmware update could not be completed.

In some embodiments, the arbitrator 310 manages conflicts between firmware update requests and handle error requests based on timing considerations. For example, if a firmware update has been in progress for less than a threshold amount of time when a conflicting MCA is received, the arbitrator 310 may process the MCA and delay the firmware update. Alternatively, if MCA processing has been in progress for less than a threshold amount of time when a conflicting firmware update request is received, the arbitrator 310 may update the firmware and delay the MCA processing.

Also, if a firmware update has been in progress for more than a threshold amount of time when (or after) a conflicting MCA is received, the arbitrator 310 may interrupt or delay processing the error even if handle error requests normally have higher priority than firmware updates. Alternatively, if a firmware update has been in progress for more than a threshold amount of time when (or after) a conflicting MCA is received, the arbitrator 310 may interrupt or delay the firmware update to process the MCA even if firmware updates normally have higher priority than MCA processing. The use of timing considerations by the arbitrator 310 could involve, for example, counters and operations that check and update the status of firmware update requests, firmware update operations, MCA signals and MCA handling operations.

In some embodiments, the arbitrator 310 manages conflicts between firmware update requests and MCAs based on the identity of particular requests (i.e., different types of firmware update requests and MCAs can be identified and handled accordingly). For example, a particular type of firmware update request may have priority over a particular type of MCA or vice versa. In such embodiments, the arbitrator 310 retrieves identifying information provided with each request and uses the identifying information to prioritize conflicting requests. In some embodiments, the arbitrator 310 combines timing considerations, priorities, and other policies to handle conflicts between firmware update requests and MCAs.

In some embodiments, at least one fixed component 314 is responsible for a basic level of MCA handling while at least one updatable component 312 is responsible for extended MCA handling. In some cases, if a firmware update is in progress, a fixed component 314 that provides basic MCA handling is available even though an updatable component 312 that provides extended MCA handling is not available. Thus, the arbitrator 310 may determine whether to delay MCA processing or to perform basic MCA handling while the firmware update is in progress. In some embodiments, the arbitrator 310 takes in account that delayed processing of some MCAs potentially results in degraded MCA handling ability by the SAL 308.

Figure 4:
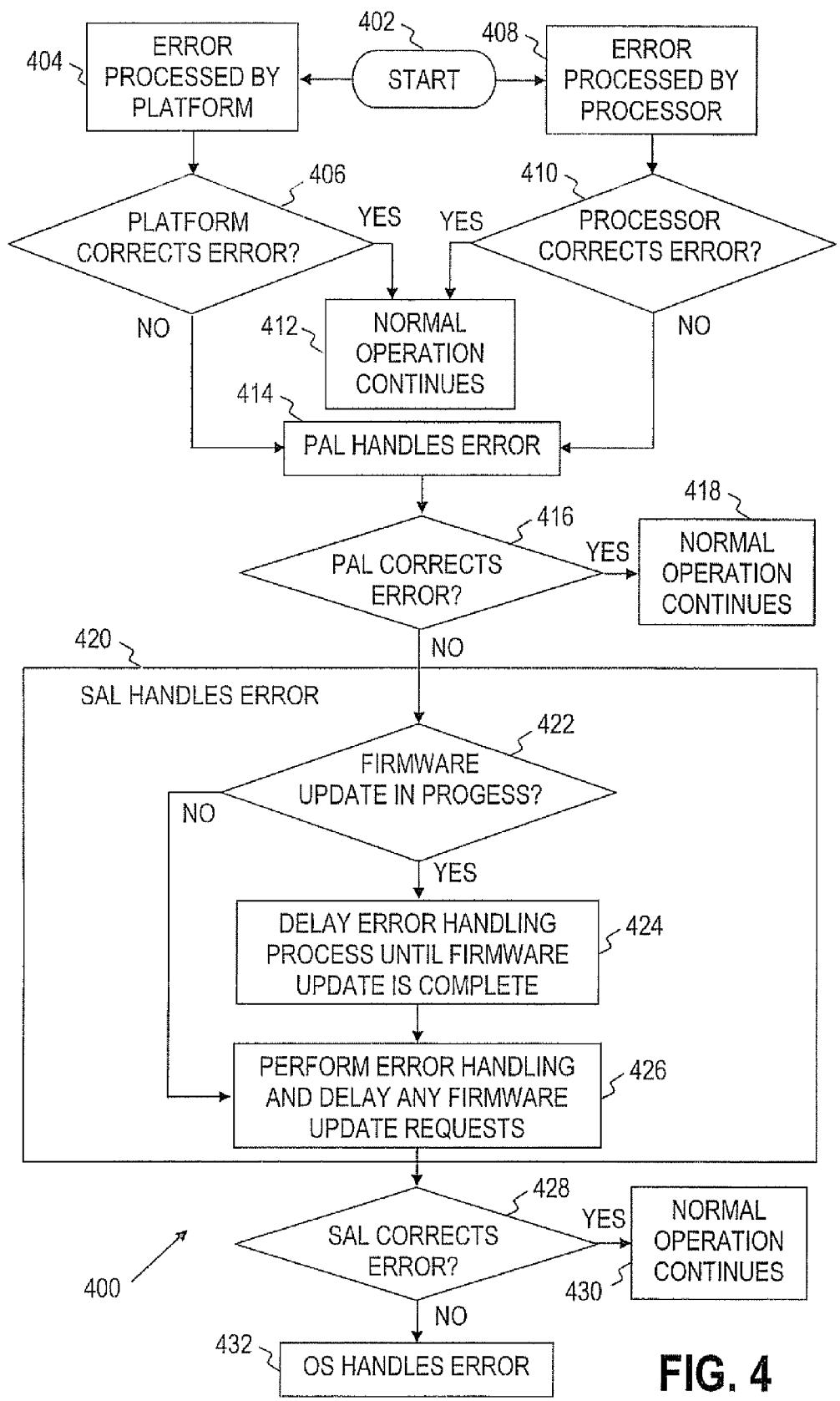
FIG. 4 shows another method in accordance with embodiments of the invention.

FIG. 4 shows another method 400 in accordance with embodiments of the invention. As shown in FIG. 4, the method 400 comprises a start block 402. In the method 400, an error is processed by a platform (block 404). If the platform corrects the error (determination block 406), normal operation continues (block 412). If the platform does not correct the error (determination block 406), a PAL firmware module handles the error (block 414).

In the method 400, an error may also be processed by a processor (block 408). If the processor corrects the error (determination block 410), normal operation continues (block 412). If the processor does not correct the error (determination block 410), the PAL handles the error (block 414). If the PAL corrects the error (determination block 416), normal operation continues (block 418). If the PAL does not correct the error (determination block 416), a SAL firmware module handles the error (block 420).

As shown in FIG. 4, block 420 involves determining if a firmware update is in progress (determination block 422). If a firmware update is in progress (determination block 422), the method 400 delays error handling until after the firmware update is complete (block 424). If a firmware update is not in progress (determination block 422) or if a firmware update is complete (block 424), error handling is performed and any firmware update requests are delayed until after error handling is complete (block 426).

If the SAL corrects the error (determination block 428), normal operation continues (block 430). If the SAL does not correct the error (determination block 428), the OS handles the error (block 432). Although not shown, the method 400 may also comprise steps such as continuing normal operation if the OS corrects the error or shutting down (restarting) the system if the OS does not correct the error.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by firmware, a firmware update request from a processor;
receiving, by the firmware, a handle error request unrelated to the firmware update request; and
arbitrating, by the firmware, between processing the firmware update
request and processing the handle error request by delaying error handling responsive to the handle error request until after a firmware update responsive to the firmware update request is complete.

2. The method of claim 1 wherein, if the handle error request is received before the firmware update request, said arbitrating comprises delaying a firmware update until after error processing is complete.

3. The method of claim 1 wherein said arbitrating comprises selectively giving priority to the handle error request.

4. The method of claim 1 wherein said arbitrating comprises enabling basic error handling and delaying extended error handling while a firmware update is performed.

5. The method of claim 1 further comprising maintaining a list of updatable firmware components and updating the list in response to the firmware update request.

6. The method of claim 1 wherein said receiving a firmware update request, said receiving a handle error request; and said arbitrating is performed by a System Abstraction Layer (SAL).

7. The method of claim 1 further comprising asserting a handle error request to an operating system (OS) if an error associated with the handle error request cannot be corrected.

8. The method of claim 1 further comprising asserting a handle error request to another entity if error processing associated with the handle error request is interrupted or delayed.

9. A computer system, comprising:
a processor; and
firmware in communication with the processor, the firmware having at least one updatable component and an arbitrator,
wherein the arbitrator manages conflicts between error handling and
firmware updates performed within the firmware by delaying error handling until after the firmware updates performed within the firmware are complete, the error handling being unrelated to said firmware updates.

10. The computer system of claim 9 wherein the at least one updatable component can be updated during runtime of the computer system.

11. The computer system of claim 9 wherein the arbitrator manages conflicts between error handling and firmware updates by delaying a firmware update until after error handling in progress is complete.

12. The computer system of claim 9 wherein the arbitrator manages conflicts between error handling and firmware updates by selectively giving priority to error handling.

13. The computer system of claim 9 wherein the firmware further comprises at least one fixed component.

14. The computer system of claim 13 wherein the at least one fixed component comprises a registry that maintains a list of currently installed firmware components and a framework that enables updatable components to communicate while a firmware update is in progress.

15. The computer system of claim 13 wherein at least one of the fixed components is involved with both error handling and firmware updates.

16. The computer system of claim 9 further comprising a firmware update application that, when executed, causes firmware update requests to be asserted to the arbitrator.

17. The computer system of claim 16 wherein the firmware update application is stored and executed locally on the computer system.

18. The computer system of claim 16 further comprising a network and a network interface that couples the processor to the network, wherein the firmware update application is stored and executed remotely on a device coupled to the network.

19. The computer system of claim 9 wherein the updatable components and the arbitrator are part of a System Abstraction Layer (SAL).

* * * * *